US009559633B2

(12) United States Patent
Shu et al.

(10) Patent No.: US 9,559,633 B2
(45) Date of Patent: Jan. 31, 2017

(54) FOLDED PHOTOVOLTAIC ASSEMBLY MOUNTING STRUCTURE AND MOUNTING METHOD THEREFOR

(71) Applicants: Yunhua Shu, Jiangsu (CN); Ahua Jiang, Jiangsu (CN); Chuanguo Fu, Jiangsu (CN)

(72) Inventors: Yunhua Shu, Jiangsu (CN); Ahua Jiang, Jiangsu (CN); Chuanguo Fu, Jiangsu (CN)

(73) Assignee: Changzhou Trina Solar Energy Co., Ltd. (CN)

( * ) Notice: Subject to any disclaimer, the term of this patent is extended or adjusted under 35 U.S.C. 154(b) by 0 days.

(21) Appl. No.: 14/531,665

(22) Filed: Nov. 3, 2014

(65) Prior Publication Data

US 2015/0129014 A1    May 14, 2015

Related U.S. Application Data

(63) Continuation of application No. PCT/CN2012/083316, filed on Oct. 22, 2012.

(30) Foreign Application Priority Data

May 3, 2012   (CN) .......................... 2012 1 0134804
Sep. 28, 2012 (CN) .......................... 2012 1 0369274

(51) Int. Cl.
*H02S 30/20*      (2014.01)
*H01L 31/042*     (2014.01)
(Continued)

(52) U.S. Cl.
CPC ................ *H02S 30/20* (2014.12); *F24J 2/526* (2013.01); *F24J 2/5233* (2013.01); *F24J 2/5239* (2013.01);
(Continued)

(58) Field of Classification Search
CPC .......... H02S 30/20; Y02B 10/12; Y02E 10/20; Y02E 10/47; F24J 2002/5277; F24J 2002/5486; F24J 2002/5273; F24J 2002/5292
(Continued)

(56) References Cited

U.S. PATENT DOCUMENTS 4,421,943 A * 12/1983  Withjack ............... F24J 2/5264
                                                    126/569
6,046,399 A    4/2000  Kapner
(Continued)

FOREIGN PATENT DOCUMENTS

CN      201369334 Y    12/2009
CN      101847665 A    9/2010
(Continued)

OTHER PUBLICATIONS

International Search Report Application No. PCT/CN2012/083316 Completed: Jan. 14, 2013; Mailing Date: Jan. 31, 2013 2 pages.

*Primary Examiner* — Brian Glessner
*Assistant Examiner* — Adam Barlow
(74) *Attorney, Agent, or Firm* — St. Onge Steward Johnson & Reens, LLC

(57) ABSTRACT

Disclosed are a folding module, a photovoltaic mounting structure, and mounting method thereof. The folding module includes a panel having front and back sides, two support blocks disposed on the back side of the panel adjacent to the two sides, two support members each hingedly connected with one of the support blocks such that the support members foldable and rotatable about the respective hinges. The photovoltaic mounting structure includes a plurality of photovoltaic modules, each module having front and back sides, each side attached with a securing block connector and a hook connector, both connectors further attached to a bracket assembly. The bracket assembly of the front side of
(Continued)

the structure is rotatable about the securing block connector and the hook connector of the front side, and the bracket assembly on the back side is rotatable about the securing block connector and the hook connector of the back side.

11 Claims, 13 Drawing Sheets

(51) Int. Cl.
| | | |
|---|---|---|
| *F24J 2/52* | (2006.01) | |
| *H02S 20/24* | (2014.01) | |
| *H02S 40/34* | (2014.01) | |
| *H02S 20/30* | (2014.01) | |
| *F24J 2/54* | (2006.01) | |

(52) U.S. Cl.
CPC ............... *H02S 20/00* (2013.01); *H02S 20/24* (2014.12); *H02S 20/30* (2014.12); *H02S 40/34* (2014.12); *F24J 2002/5277* (2013.01); *F24J 2002/5292* (2013.01); *F24J 2002/5486* (2013.01); *Y02E 10/47* (2013.01); *Y02E 10/50* (2013.01); *Y10T 29/49963* (2015.01)

(58) Field of Classification Search
USPC ........ 52/173.3; 126/623, 680; 136/244, 246; 454/900
See application file for complete search history.

(56) References Cited

U.S. PATENT DOCUMENTS

| | | | | |
|---|---|---|---|---|
| 7,814,899 B1* | 10/2010 | Port | ....................... | F24J 2/5211 |
| | | | | 126/571 |
| 7,857,269 B2* | 12/2010 | Plaisted | .................. | F16L 3/127 |
| | | | | 248/125.8 |
| 8,590,223 B2* | 11/2013 | Kilgore | .................. | F24J 2/5256 |
| | | | | 136/244 |
| 9,115,915 B2* | 8/2015 | Lu | ........................... | F24J 2/5254 |
| 2010/0258158 A1* | 10/2010 | Kuster | .................. | F24J 2/5232 |
| | | | | 136/244 |
| 2010/0288337 A1 | 11/2010 | Rizzo | | |
| 2011/0174748 A1* | 7/2011 | Civit Vidal | ................ | F24J 2/36 |
| | | | | 211/1.51 |
| 2011/0265861 A1* | 11/2011 | Nabauer | ................... | E04C 3/07 |
| | | | | 136/251 |
| 2011/0309215 A1* | 12/2011 | Lu | ........................... | F24J 2/5254 |
| | | | | 248/165 |
| 2012/0085340 A1 | 4/2012 | Hinderling et al. | | |
| 2013/0248467 A1* | 9/2013 | Wever | .................... | F24J 2/5211 |
| | | | | 211/41.1 |

FOREIGN PATENT DOCUMENTS

| | | | |
|---|---|---|---|
| CN | 201904353 U | | 7/2011 |
| CN | 102187163 A | | 9/2011 |
| CN | 201985126 U | | 9/2011 |
| CN | 102315331 A | | 1/2012 |
| CN | 202103062 U | | 1/2012 |
| CN | 102683444 A | | 9/2012 |
| DE | 102010001770 A1 | | 11/2010 |
| DE | 102010017705 A1 | | 1/2012 |
| FR | 2950956 A1 | | 4/2011 |
| FR | 2953912 A1 | | 6/2011 |
| JP | 3118743 U | | 2/2006 |
| JP | 2006278738 A | | 10/2006 |
| JP | 2009302123 A | | 12/2009 |
| JP | 2012054420 A | | 3/2012 |
| WO | WO 0273703 | * | 2/2002 |
| WO | 2006121013 A1 | | 11/2006 |
| WO | WO2009074335 | * | 6/2009 |
| WO | 2012031286 A2 | | 3/2012 |

* cited by examiner

FOLDED PHOTOVOLTAIC ASSEMBLY MOUNTING STRUCTURE AND MOUNTING METHOD THEREFOR

FIELD OF THE INVENTION

The present disclosure relates to the field of mounting and manufacturing of solar photovoltaic module, particularly relates to a folding module, and more particularly relates to a folding module suitable for solar photovoltaic device as well as a solar photovoltaic system module and mounting structure thereof for disclosure to the flat roof of a building.

BACKGROUND OF THE INVENTION

A solar photovoltaic module is a key component for a solar power generation system, and is also the most valuable component in the solar power generation system. The function of the module is to convert solar energy into electrical energy, either to deliver the electrical energy to a battery for storage, or to drive a workload. The quality and cost of the solar photovoltaic module decides the quality and cost of the whole system.

A solar photovoltaic module of prior art is basically comprised of a solar cell, a piece of tempered glass covering on the surface of the solar cell and a aluminum frame surrounding the solar cell. In particular, the aluminum frame is provided basically for supporting the solar photovoltaic module with a support member when mounting the solar photovoltaic module. For example, Chinese patent disclosure (CN201773843U) discloses a solar photovoltaic module frame and a solar photovoltaic module, in which the solar photovoltaic module is surrounded by the module frame as mentioned above.

At present, techniques for mounting crystalline silicon solar photovoltaic modules have been well-developed. Generally, a number of solar photovoltaic modules are mounted on the light-facing surface of the building or the ground by employing a mounting structure such as the mounting frames as mentioned above.

In the prior art, as to photovoltaic module mounting systems which are suitable for flat roofs, many photovoltaic manufacturers and system constructors employ their own structural mounting system, such as Kyocera solar mounting structure, Panelclaw solar mounting solution, Sunlink mounting module, Schletter mounting system, or the likes. Among these mounting systems, some are simple in structure and convenient for mounting but are poor in system mechanical strength and require complicated parts, others use simple parts and have a robust mechanical strength but are difficult to mount on site, thereby being labor costly.

Besides, nearly all the present solar photovoltaic modules equip with a supporting structure which provides support members on the mounting frame (for example, a aluminum frame) or builds support members which is not adjustable on the back of the photovoltaic module.

For example, German Patent Disclosure (DE102010017705A1) discloses a photovoltaic module, disclosure the support structure of which, as shown in FIG. 10 and FIG. 11, comprises: a stopper disposed at one end of a guide rail to secure one side of the photovoltaic module, and a vertical support member disposed at the other end of the guide rail to hold the other side of the module. In particular, the support structure is a divided structure. Thus, the present support structure would inevitably require a mounting frame. Alternatively, it needs a support member with non-adjustable height, which would all occupy a large space for shipping and manufacturing. As a alternative, the support structure and the solar photovoltaic module are disassembled for separate shipping and assembly, which brings additional inconveniences for mounting and shipping.

Therefore, there is a need for a solar photovoltaic module and its related mounting system, with simplified structure, convenience in mounting, overall robust mechanical strength, simple parts and low cost.

SUMMARY OF THE INVENTION

With regard to the deficiencies of prior art, at least one of the objects of the present disclosure is to provide a folding module suitable for solar photovoltaic modules as well as mounting structure thereof.

According to an aspect of the present disclosure, a folding module is provided, which comprises: a panel having a front side and a backside; a first support block and a second support block disposed on the backside of the panel adjacent to two sides of the panel respectively; and a first support member and a second support member, the first support member connected with the first support block via a first hinge, and the second support member connected with the second support block via a second hinge, wherein the first support member and the second support member can fold and rotate about the first hinge and the second hinge respectively.

Preferably, in the above folding module, the panel is a solar photovoltaic module, and the front side of the panel is a light-receiving side.

Preferably, in the above folding module, the first and second support blocks are secured on the backside of the panel via an adhesive material.

Preferably, in the above folding module, the first support member and the second support member are adjustable in length.

Preferably, in the above folding module, the first support member and the second support member are retractable support members which are adjustable in length.

Preferably, in the above folding module, at least one of the first support member and the second support member further comprises: a back-shaped member and a support bar, wherein one end of the back-shaped member is directly connected to the bottom of the first support block or the second support block, and one end of the support bar is connected to the back-shaped member at a joint on one side thereof, such that the joint, the other end of the support bar and the other end of the back-shaped member constitute a triangle support structure, wherein the support bar can rotate about the joint to provide adjustment for the height of at least one of the first support structure and the second support structure.

Preferably, in the above folding module, the panel is a frameless panel.

Preferably, in the above folding module, further comprising a junction box disposed on the backside of the panel.

According to a further aspect of the present disclosure, the solar photovoltaic module mounting structure as disclosed in the present disclosure is basically made of aluminum parts, and assembling of front and rear brackets is accomplished in factory; when mounting in the field, it only needs to open the brackets to an appropriate position and secure the screws on both sides of the securing block, to employ the front and rear brackets for the mounting member of the system; the keel of the system is simple and is feasible to be secured by a cover slab in the field. Since the front and rear members may be retracted and the mounting keel is short, it is for shipping of the module and handling of the mounting parts. Besides, since all the parts are made from aluminum section bars by extrusion molding, the module is convenient in machining and light-weight; the front cross-coupling beam of the front bracket and the shield wind of the rear bracket in the system are designed to provide support for the structure, so as to improve the mechanical strength.

According to a further aspect of the present disclosure, a photovoltaic module mounting structure is provided, comprising: a plurality of photovoltaic modules (1), each of which is attached with: a first backside securing block connector member (3) and a first backside hook connector member (9a) attached to a first side of the photovoltaic module, the first backside securing block connector member (3) and the first backside hook connector member (9a) further attached to a front bracket assembly; a second backside securing block connector member and a second backside hook connector member (3) attached to a second side of the photovoltaic module (9a), the second backside securing block connector member (3) and the second backside hook connector member (9a) further attached to a rear bracket assembly; wherein the front bracket assembly is freely rotatable about the first backside securing block connector member (3) and the first backside hook connector member (9a), and the rear bracket assembly is freely rotatable about the second backside securing block connector member (3) and the second backside hook connector member (9a).

According to a further aspect of the present disclosure, a method for mounting the above photovoltaic module mounting structure, comprising: deploying the bottom connector member (12); opening the front bracket assembly and the rear bracket assembly of the photovoltaic module (1) and rotating them to a mounting position, then securing them again; moving the module configured to mounting position onto the bottom connector member; after checking all the members, disposing a cover slab (13) to secure the front bracket assembly and the rear bracket assembly; inserting a cover slab bolt (14) into the securing cover slab and securing it, thereby securing the photovoltaic module onto the bottom connector member.

One of the objects of the present disclosure is to provide a solar photovoltaic module and the mounting system thereof, which has at least the following technical advantages over the existing photovoltaic module mounting system:

1. A folding module is employed without an aluminum frame to provide support for the solar photovoltaic module, which may greatly reduces the manufacturing cost, saves raw material, and realizes frameless mounting of the module.

2. Since the module is already assembled beforehand in the factory, it may provide reduced intensity of labor for mounting in the field, time cost saving, improved mounting efficiency and reduced mounting cost; the mounting system has less structural parts, such that it is easy for handling and inexpensive for shipping; the module is made light-weight so as to reduce the roof load; the constituting parts thereof do not require special machining, which reduces manufacturing cost.

3. In contrast with the existing mounting structure, the present disclosure provides a support structure comprised of a support block, a hinge and a folding and rotating support member such that an integrated structure of the panel and the support structure is formed, which provides accommodation and mounting tilt adjustment by folding and rotating the support member. When accommodating the support structure, it only needs to fold the support member and rotate it to be parallel with the panel, such that the volume for the whole folding module is minimized to facilitate packing and shipping.

It is to be understood that the above summary and the following detailed description of the present disclosure are exemplary and explanatory, and are intended to provide further explanation for the present disclosure as claimed in the claims.

BRIEF DESCRIPTION OF THE DRAWINGS

The accompanying drawings are included to provide a further understanding of the disclosure, which are incorporated and constitute a part of the present disclosure. The accompanying drawings illustrate embodiments of the present disclosure, and serve to demonstrate the principles of the present disclosure together with the Description. Upon reading the following non-limiting particular embodiments of particular of the present disclosure in conjunction with the Drawings, other features and advantages of the present disclosure will become apparent. In which.

DETAILED DESCRIPTION OF THE INVENTION

Figure 1:
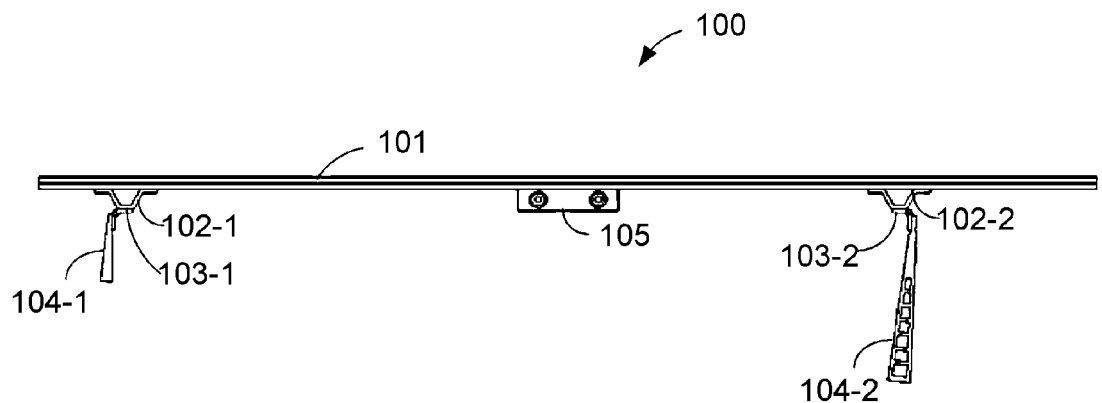
FIG. 1 shows a structural diagram of one preferred embodiment of a folding module in an unfolded state, according to one embodiment of the present disclosure.

Embodiments of the present disclosure will now be described in detail with reference to the accompanying drawings. Detailed reference will now be taken to the preferred embodiment of the present disclosure, which examples are illustrated in the drawings. Whenever possible, the same reference numbers will used to denote the same or like parts throughout the drawings. In addition, although the terms used in the present disclosure is selected from well-known and well-used common terminology, some of the terms mentioned in the Description of the present disclosure is selected by the applicant according to his or her judgment, and the detailed meaning of which are explained in the related parts herein. Besides, it is intended that the present disclosure is to be understood not only by the actual terms used, but also through the implied meaning of each term.

In the following, an aspect of the present disclosure will be illustrated with reference to FIGS. 1-7. A skilled person in the art would understand that the following descriptions with reference to FIGS. 1-7 are not limited to an individual embodiment, but may be subject to any of combination, modification, adaption and adjustment according to practical situation in the field or design requirements, so as to achieve any other alternative implementations.

FIG. 1 shows a structural diagram of one preferred embodiment of a folding module in an unfolded state, according to one embodiment of the present disclosure. The folding module 100 of the present disclosure basically comprises: a panel 101, a support block 102, a hinge 103 and a support member 104.

Typically, the panel 101 is a solar photovoltaic module having a front side and a backside. The front side of the panel 101 is the light-receiving side. Since the present disclosure employs a support structure which are completely different from those of prior art, the panel 101 of the present disclosure can be made to be a frameless panel to save manufacturing cost.

As shown in FIG. 1, two support blocks 102-1 and 102-2 are provided on the backside of the panel 101, and are close, respectively, to the two sides of the panel 101 in the longitudinal direction. Preferably, the first and second support blocks 102-1 and 102-2 may be secured on the backside of the panel 101 via adhesive materials such as double-sided tapes, silicone, tapes and silicone, or may be secured on the backside of the panel 101 by means of perforating and securing with screws. Alternatively, the present disclosure is not limited to use only two support blocks. It will be appreciated by one skilled in the art that any number of support blocks may be applied based on the present disclosure according to practical needs, and the support blocks may be disposed at various locations along the longitudinal direction of the panel. Further, other known manners for securing the support blocks onto the backside of the panel 101 may also be utilized according to particular needs for machining.

Figure 5A:
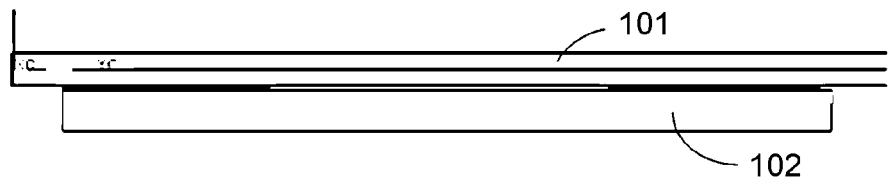
FIGS. 5a and 5b show two preferred constructs for a support block respectively, according to one embodiment of the present disclosure.
Figure 5B:
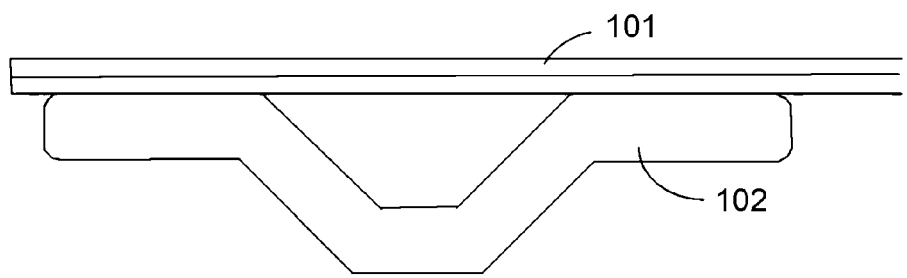

FIGS. 5a and 5b illustrate two preferred constructs for a support block, respectively. The support block 102 may comprises a flat-plate support block, as shown in FIG. 5a. Alternatively, a V-shape support block may be utilized, as shown in FIG. 5b.

According to one embodiment, a first support member 104-1 is connected to the first support block 102-1 via a first hinge 103-1, and a second support member 104-2 is connected to the second support block 102-2 via a second hinge 103-2. The hinges 103 and the support blocks 102 may be connected with adhesive tapes or by means of securing with screws. The first support member 104-1 and the second support member 104-2 may serve to support the whole module and may serve as windshields, which provides better wind-proof performance for the module. Since it is needed to sustain a large load stress, the support members is designed with sufficient strength. Referring to the embodiments as shown in FIGS. 1-4, the support members 104-1 and 104-2 as shown are designed to be triangle-shape. Preferably, the support members with triangle-shape are designed by taking into consideration of plastic shrinking, hollow design and cost saving. In addition, the support members have a shape of section bar and may be fabricated by extrusion-molding, which provide advantages of high efficiency, low cost, etc.

Figure 2:
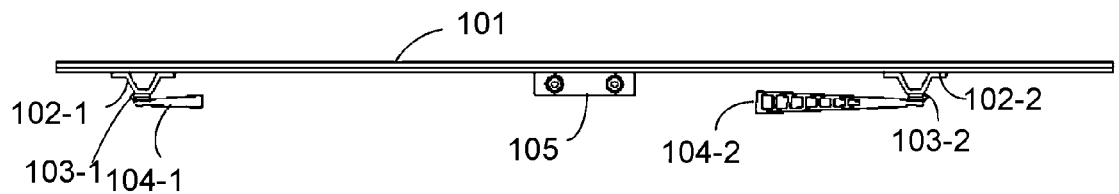
FIG. 2 shows a structural diagram of one preferred embodiment of the folding module in a folded state, according to one embodiment of the present disclosure.

The first support member 104-1 and the second support member 104-2 can fold and rotate about the first hinge 103-1 and the second hinge 103-2, respectively. For example, in the embodiment as shown in FIG. 1, the folding module 100 is in a unfolded state in which the support members 104-1 and 104-2 are orthogonal to the panel 101, e.g. being an angle of 90 degree with respect to the panel 101. On the other hand, in the embodiment as shown in FIG. 2, the folding module 100 is in a folded state in which the support members 104-1 and 104-2 are in horizontal state with respect to the panel 101, e.g. at an angle of 0 degree with respect to the panel 101. Thus, the folded state is quite suitable for packing and shipping and thereby saving space and cost. The folding module may be switched to unfolded state for mounting such that the folding module as a whole is adjusted to an appropriate tilt angle.

Furthermore, to facilitate the adjustment of the tilt angle of the solar panel 101, the length of the first support member 104-1 and the second support member 104-2 are adjustable. For example, the first support member 104-1 and the second support member 104-2 may comprise retractable support members with adjustable length. Alternatively, the first support member 104-1 and the second support member 104-2 may be constructed as a structure having multiple segments with each segment capable of a 90 degree bending with respect to each other, so as to perform height adjustment. Alternatively, in order to adjust the height, the present disclosure may apply a structure in which the tilt angle of the first support member 104-1 and the second support member 104-2 with respect to the panel or the mounting surface (such as the ground or the roof, and the likes) can be designated and sustained. Other structures known in the art may also be used to achieve a similar tilt angle adjustment.

Figure 7:
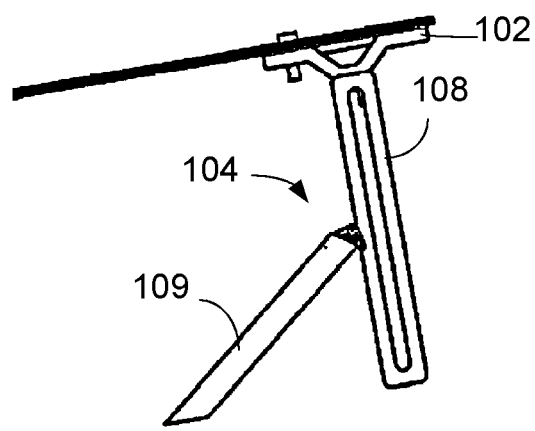
FIG. 7 shows another preferred example structure of a support member, according to one embodiment of the present disclosure.

Further, FIG. 7 shows another preferred example structure for the support members. As an example, the support member 104 may be constituted of a back-shaped member 108 and a support bar 109. One end of the back-shaped member 108 is directly connected to the bottom of the support block 102, and one end of the support bar 109 is connected to the back-shaped member 108 at a joint point, such that the joint point, the other end of the support bar 109 and the other end of the back-shaped member 108 constitute a triangle support structure, thereby achieving a effective high strength for the front and rear support members. Besides, the support bar 109 may further rotate about the joint point, for adjusting the height of the whole support member 104.

Figure 3:
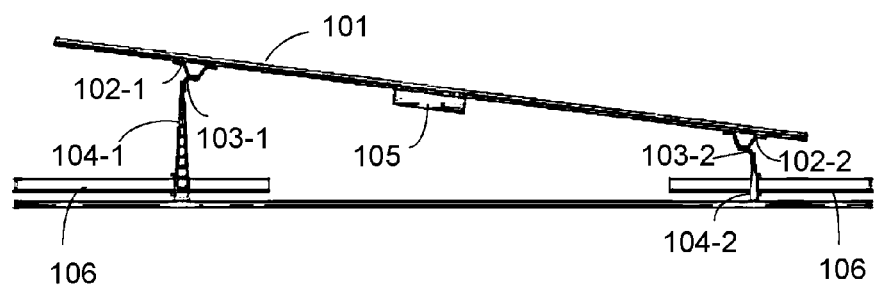
FIG. 3 shows an mounting example for the folding module, according to one embodiment of the present disclosure.
Figure 4:
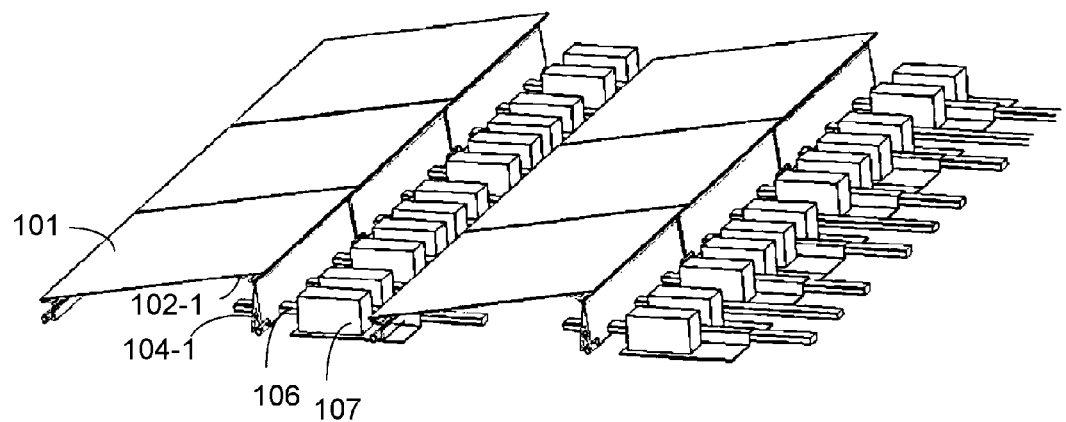
FIG. 4 shows a schematic view of overall mounting scenario for the folding module, according to one embodiment of the present disclosure.

For example, FIG. 3 shows a mounting example for the folding module, according to the present disclosure. FIG. 4 shows a schematic view of overall mounting scenario for the folding module, according to the present disclosure. As shown, the first support member 104-1 and the second support member 104-2 are unfolded and rotated to an unfolded state with an angle of 90 degree with respect to the mounting surface (e.g. the ground). Since the hinges are rotatable, a securing strip is designed throughout the module. For example, in the embodiment of FIG. 3, two fixing strips 106 go through the first support member 104-1 and the second support member 104-2 respectively, such that the whole folding module is secured. As shown in FIG. 4, the fixing strip 106 goes through the rear support member of a previous module and the front support member of a latter module, with a cover slab 107 in the middle for enhancing the structure. The rotation of the hinge and the front and rear support members may be substantially limited by the fixing strip 106. Besides, the whole folding module structure becomes more robust due to mutual connection among the individual modules.

Figure 6:
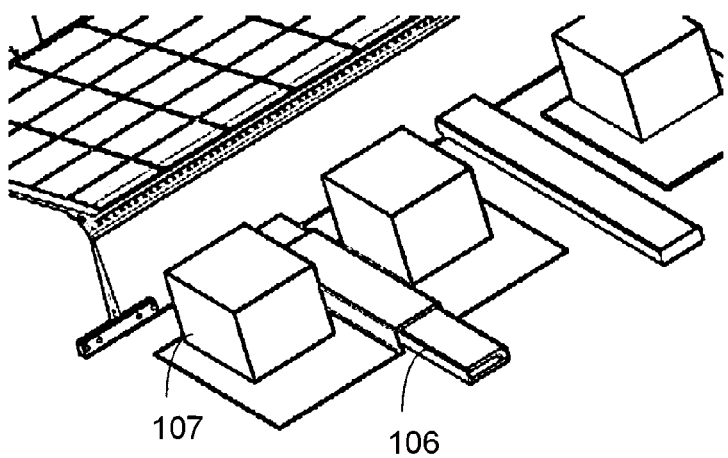
FIG. 6 shows an example structure of a cover slab, according to one embodiment of the present disclosure.

FIG. 6 shows an example of the structure of the cover slab. As shown in FIG. 6, the cover slab 107 is a simple extrusion member, and is constructed as a bump structure surrounded with wings. The bump structure may be conveniently mated with the front and rear fixing strips 106, and the weight of the ballasts at the left and right sides thereof may be adjusted according to the on site wind speed.

Further, in the embodiment shown in FIG. 3, the length of the first support member 104-1 may be set to be larger than the length of the second support member 104-2, such that a desired tilt angle is formed between the panel 101 and the mounting surface (e.g. the ground). On the other hand, when it is needed to store, pack and ship the whole folding module before or after the mounting, the first support member 104-1 and the second support member 104-2 may be folded and rotated to a folded state in parallel with the panel 101 (referring to FIG. 2). Apparently, in this folded state, the volume of the whole folding module 100 will be minimized for improved efficiency of packing and shipping.

According to another aspect, as shown in FIGS. 1-3, the folding module 100 may further comprise a junction box 105 disposed on the backside of the panel 101.

Hereinafter a further aspect of the present disclosure is illustrated with reference to FIGS. 8-25. A skilled person in the art would understand that the following descriptions with reference to FIGS. 8-25 are not limited to a single embodiment, and may be subject to any of combination, modification, adaption and adjustment according to practical situation in the field or design requirements, so as to achieve other alternative implementations. Besides, the various implementations as described according to FIGS. 8-25 may be used in combination with the various implementations as described according to FIGS. 1-7, which is also within the sprit and substance embraced by the present disclosure and the claims thereof.

Figure 8:
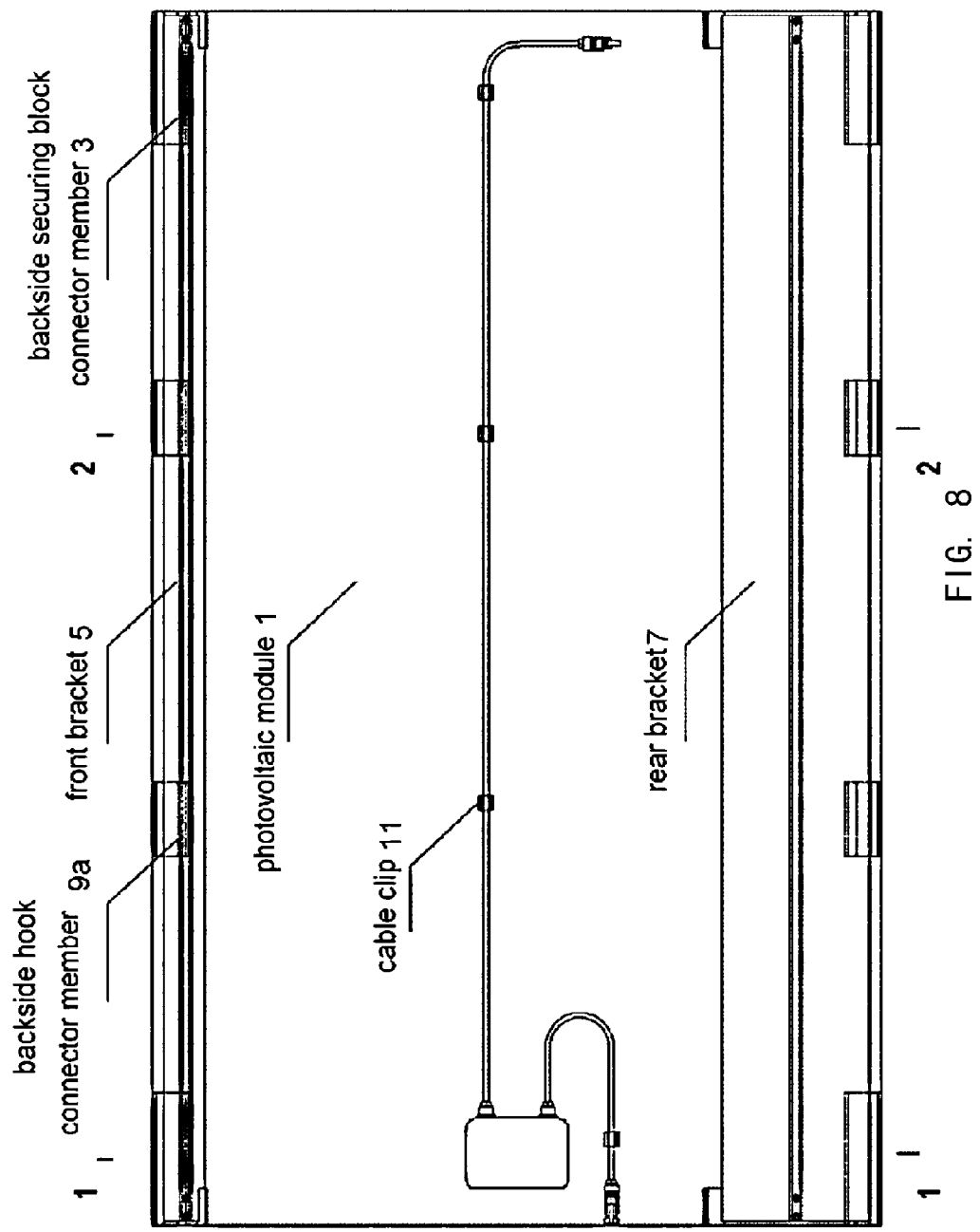
FIG. 8 shows a backside view of a frameless photovoltaic module system, according to a further embodiment of the present disclosure.
Figures 9, 10:
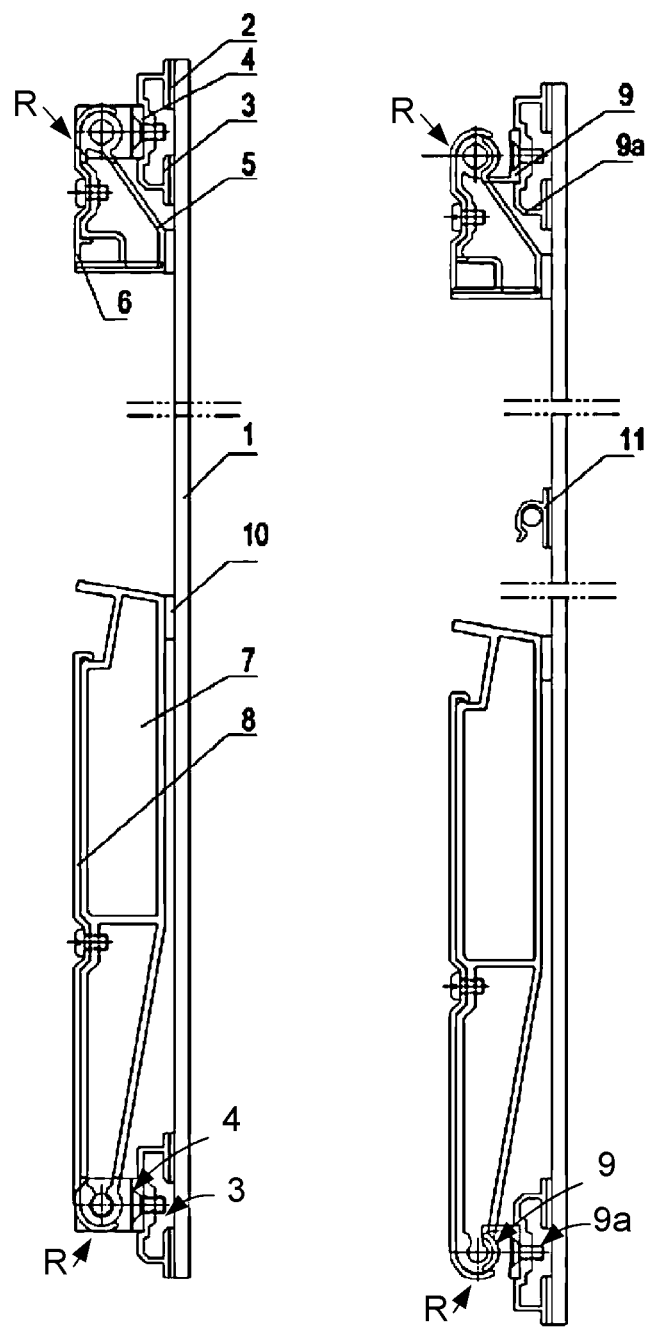
FIG. 9 shows a cross-sectional view of the front and rear brackets taken along the section line 1-1 in the rear view as shown in FIG. 8, according to a further embodiment of the present disclosure.
FIG. 10 shows a cross-sectional view of the hook member taken along the section line 2-2 in the rear view as shown in FIG. 8, according to a further embodiment of the present disclosure.

FIG. 8 shows a backside view of a frameless photovoltaic module system according to an aspect of the present disclosure. FIG. 9 shows a cross-sectional view of the front and rear brackets taken along the section line 1-1 in the rear view as shown in FIG. 8, according to an aspect of the present disclosure. FIG. 10 shows a cross-sectional view of the hook member taken along the section line 2-2 in the rear view as shown in FIG. 8, according to an aspect of the present disclosure.

As shown in FIGS. 8-10, the frameless photovoltaic system according to one aspect of the present disclosure comprises: a frameless photovoltaic module 1, an adhesive structural tape 2, a backside securing block connector member 3, a securing block 4, a front bracket 5, a front cross-coupling beam 6, a rear bracket 7, a rear wind shield 8, a hook member 9, a backside hook connector member 9a, a liner pad 10, a cable clip 11, a bottom connector member (also referred to as keel frame) (not shown), a securing cover slab 13 (not shown).

According to one embodiment, the photovoltaic module 1 uses a frameless design. As shown in FIG. 8, the junction box (as shown in the left of the figure) on the backside of the module 1 provides both a long cable and a short cable, for facilitating mounting work. The cables are secured on the backside of the module 1 with a cable clip 11. The cable clip 11 is attached onto the backside of the module 1 by bonding or the like.

Referring to FIG. 8 in conjunction with the cross-sectional views of FIGS. 9-10, it can be more clearly seen that the module 1 is attached to the front bracket 5 (exemplarily shown on the top of the module 1 in FIG. 8) and the rear bracket 7 (exemplarily shown on the bottom of the module 1 in FIG. 8). A backside securing block connector member 3 and a backside hook connector member 9a are attached at attaching positions on one side of the module 1 corresponding to the front bracket 5. The two connector members may be attached to the module 1 by means of bonding or the like with an adhesive material made of structural adhesive tape 2 or structural silicone, wherein the adhesive material is required to have weather resistance and adhesive properties, such that the static and dynamic load capacity thereof is sufficient for overall stability. Similarly, a backside securing block connector member 3 and a backside hook connector member 9a are also attached to the opposite side (the side opposing to the side attached with the front bracket 5) of the module 1 at attaching positions corresponding to the rear bracket 7, also by means of bonding (i.e. with structural adhesive tapes 2) or the like. Besides, a liner pad 10 is additionally disposed at the positions where the backside of the module 1 contacts with the rear bracket 7, for preventing the rear bracket 7 from impacting the backside of the module 1 during shipping and mounting.

Figure 11:
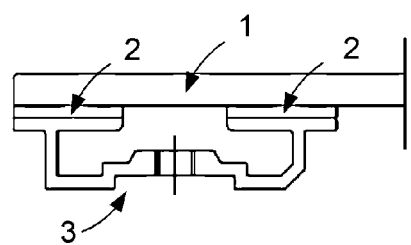
FIG. 11 shows a diagram of the backside connector member bonded with the module, according to a further embodiment of the present disclosure.
Figure 12:
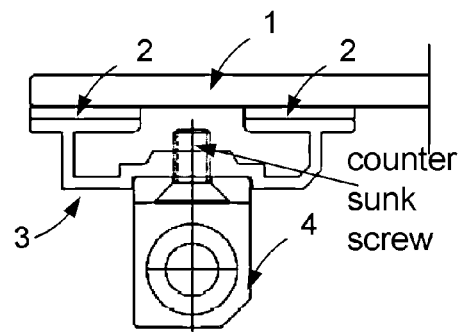
FIG. 12 shows a diagram of the backside connector member connected with the securing block, according to a further embodiment of the present disclosure.
Figure 13:
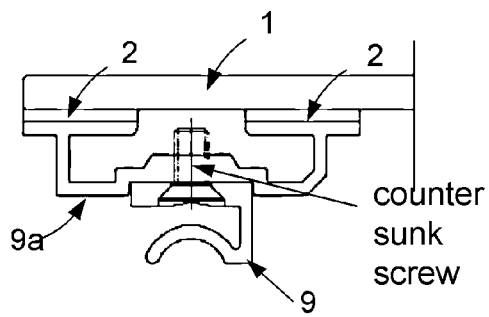
FIG. 13 shows a diagram of the backside connector member connected with the hook member, according to a further embodiment of the present disclosure.

FIG. 11 shows a diagram of the backside securing block connector member 3 bonded with the module 1, according to an aspect of the present disclosure. FIG. 12 shows a diagram of the connection structure of the backside securing block connector member 3 bonded with the module 1 and further attached with securing block 4, according to an aspect of the present disclosure. FIG. 13 further shows a diagram of the connection structure of the backside hook connector member 9a bonded with the module 1 and further attached with a hook member 9, according to an aspect of the present disclosure.

According to an aspect of the present disclosure, both of the backside securing block connector member 3 and the backside hook connector member 9a are similarly designed and formed from a section bar by extrusion molding, the cross sections of which are shown in FIGS. 11 and 13. Adhesive tapes 2 are disposed at predetermined attaching positions where the top wing surfaces of the backside securing block connector member 3 and the backside hook connector member 9a are attached with the module 1. The bottom surfaces of the connector members 3 and 9a in contact with the securing block 4 and the hook member 9 are curved to form a shallow groove for defining a mounting location for the securing block or the hook member. Furthermore, a screw hole is formed on the bottom surface of the connector members 3 and 9a, corresponding to a connection counter bore of the securing block or hook member.

During the mounting, the connector members 3 and 9a are attached (such as, by means of bonding) to the module 1 at first, then the securing block 4 is connected to the backside securing block connector member 3 with a countersunk screw, and then the hook member 9 is connected to the backside hook connector member 9a with a countersunk screw.

In one embodiment of the present disclosure, the securing block 4 is L-shaped. To ensure the connection strength, the securing block 4 is required to have a thickness. A set of sink holes are disposed on the bottom of the securing block 4. The countersunk screws go through the sink holes, for connecting the securing block 4 with the backside securing block connector member 3 and with the front and rear brackets. As shown in FIG. 12, the securing block 4 has a chamfered side at a side opposing to the sink holes, basically for ensuring smooth rotation of the front and rear brackets.

In one embodiment of the present disclosure, the cross section of the hook member 9 is shown in FIG. 13. The hook member 9 is basically comprised of a bottom surface and an arc hook portion. This shape is provided for mating with the backside connector member, the top R-shaped member of the front cross-coupling beam 6 (as shown in FIG. 10) and the top R-shaped member of the rear windshield (as shown in FIGS. 9 and 10). A sink hole s disposed on the bottom of the hook member 9. A through which the countersunk screw goes through the sink hole, for securing the backside hook connector member 9a with the front and rear brackets. The arc hook portion of the hook member has a concave rounded surface for mating with the top R-shaped member of the front cross-coupling beam 6 and the top R-shaped member of the rear windshield 8. When the module 1 is subject to a positive wind pressure (i.e. a wind pressure blowing to the front side of the module 1 such that the module 1 is pressed towards the support system), the module 1 is pressed down, causing the backside hook connector member 9a and the hook member 9 to be pressed down and mated with the top R-shaped member of the front cross-coupling beam 6 and the top R-shaped member of the rear windshield 8, thereby transferring the load from the module to its underlying members. Furthermore, the bottom arc hook portion of the hook member 9 serves as a rotation pin for limiting the rotation of the front and rear brackets. When the module 1 is subject to a negative wind pressure (i.e. a wind pressure blowing to the rear side of the module 1 such that the module 1 is blow away from the support system), the bottom arc hook portion may be hooked with the top R-shaped member of the front cross-coupling beam 6 and the top R-shaped member of the rear windshield 8, thereby resisting the negative wind pressure together with the whole support system.

Figure 14:
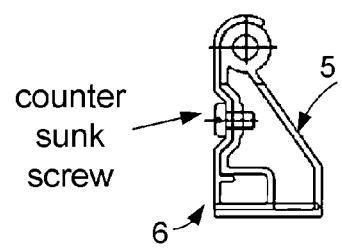
FIG. 14 shows a sectional view of the front bracket assembly, according to a further embodiment of the present disclosure.
Figures 15, 16:
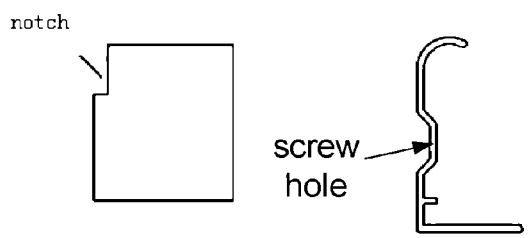
FIG. 15 shows a schematic view of the rotation limiter notch of the front bracket and the rear bracket, according to a further embodiment of the present disclosure.
FIG. 16 shows a sectional view of a front cross-coupling beam, according to a further embodiment of the present disclosure.

FIG. 14 shows a sectional view of a front bracket assembly, according to an aspect of the present disclosure. As shown, the front bracket assembly is comprised of the front bracket 5 and the front cross-coupling beam 6, with an R-shaped member formed on the top thereof. The top of the front bracket assembly is connected to the securing block 4 with a countersunk screw, while the bottom surface of the front bracket assembly is secured to the bottom connector member (keel frame) 12 (not shown) by a cover slab structure and is at a right angle with respect to the bottom connector member (keel frame) 12. In the assembly, a side surface of the front bracket 5 fits the front cross-coupling beam 6. The front bracket 5 is a rotating member, which is formed with a cylindrical head and is shaped into an R-shaped member (as viewed from the cross section), and is provided with a rounded hole for facilitating thread machining. The side portion of the front bracket is formed to be a slope structure (as seen from the right side of FIG. 14), to avoiding any potential collision with the backside securing block connector member 3 of the module 1. A connection portion of the side portion of the front bracket 5 mating with the front cross-coupling beam 6 (exemplarily shown in the left of the figure) has a groove which couples with the groove at the side surface of the cross-coupling beam 6 (as shown in FIG. 16). A screw hole is provided in the groove such that a connecting bolt head may go through the screw hole to connect with the screw hole in the groove at the side surface of the cross-coupling beam 6, thereby assembling the front bracket 5 with the front cross-coupling beam 6. The bottom portion of the front bracket assembly is further provided with a mounting slot for cover slab mounting.

Figure 19:
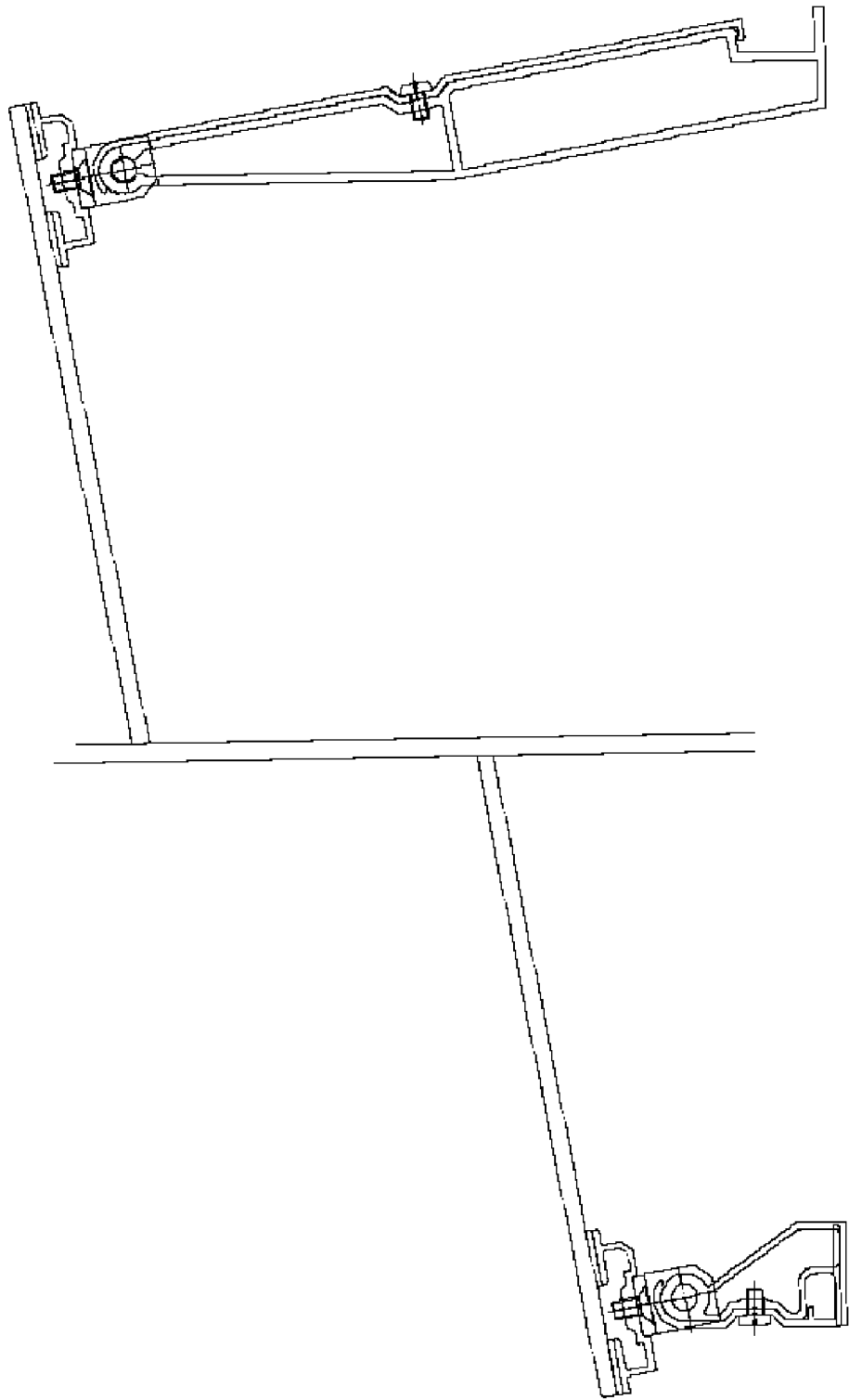
FIG. 19 shows a schematic view of rotation limitation of the front bracket and the rear bracket on site, according to a further embodiment of the present disclosure.

The head portion of the front bracket 5 is machined to form a rotation limiter notch. FIG. 15 shows a schematic view of the rotation limiter notch of the front bracket, according to an aspect of the present disclosure. As shown in the figure, when the front bracket assembly is rotated to a predetermined mounting position, the bottom side of the notch contacts with the lower side of the securing block, providing limiting as shown in the left of FIG. 19. Due to the relatively small height of the front bracket, the notch would not provide any limitation if it is machined to be bigger. When the securing block bolt is released, the module may be rotated in the system, which would be more convenient for system maintenance. The front bracket 5 is symmetrically machined. A side of the lower portion of the front bracket 5 adjacent to the front cross-coupling beam 6 is designed to be a corner slot surface above the bottom portion.

FIG. 16 shows a cross-sectional view of the front cross-coupling beam 6 according to one aspect of the present disclosure. The front cross-coupling beam is required to have a certain strength and rigidity to serve as a bottom side support bar for the module system. The top portion of the front cross-coupling beam is designed to be an arc surface, which may be mated with the hook assembly 9 through a shaft structure, such that the front bracket assembly can rotate smoothly. The side surface of the front cross-coupling beam 6 is provided with a groove in which a screw hole is provided. A connecting bolt may go through this screw hole to connected it with a screw hole in the side groove at the side surface of the front bracket 5. Further, the groove may accommodate the connecting bolt such that it does not protrude beyond the side plane of the cross-coupling beam 6. The corner slot surface of the front bracket 5 is clamped by the lower portion of the cross-coupling beam 6, so as to better connect with the front bracket 5. The lower portion basically functions to increase rigidity of the coupling beam. The purpose of the lower portion is to increase the rigid of the beam. The end at the other side of the lower portion of the cross-coupling beam 6 fits the lower portion of the front bracket 5, and is machined with a notch and a bolt hole by punching.

Figures 17, 18:
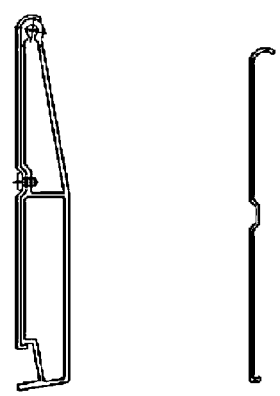
FIG. 17 shows a sectional view of the rear bracket assembly, according to a further embodiment of the present disclosure.
FIG. 18 shows a sectional view of a rear windshield, according to a further embodiment of the present disclosure.

FIG. 17 shows a cross-sectional view of the rear bracket assembly according to one aspect of the present disclosure. The rear bracket assembly is comprised of a rear bracket 7 and a rear windshield 8, and is formed with an R-shaped member on the top portion thereof. Similar with the front bracket assembly of FIG. 14, the top portion of the rear bracket assembly is connected to the securing block 4 via a countersunk bolt, and the bottom portion thereof is secured to the bottom connector member (keel frame) 12 by a cover slab structure. In the assembly, a side surface of the rear bracket 7 fits the rear cross-coupling beam 8. The rear bracket 7 is a rotating member, which is formed with a cylindrical head and is shaped into an R-shaped member (as viewed from the cross section), and is provided with a rounded hole for facilitating thread machining. The side portion of the rear bracket is formed to be a slope structure (as seen from the right side of FIG. 17), to avoiding any potential collision with the backside securing block connector member 3 of the module 1. A connection portion of the side portion of the rear bracket 7 mating with the rear windshield 8 (exemplarily shown in the left of the figure) has a groove which couples with the groove at the side surface of the rear windshield 8 (as shown in FIG. 18). A screw hole is provided in the groove such that a connecting bolt head may go through the screw hole to connect with the screw hole in the groove at the side surface of the rear windshield 8, thereby assembling the rear bracket 7 with the rear windshield 8. The bottom portion of the rear bracket assembly is further provided with a mounting slot.

Similarly, the head portion of the rear bracket 7 is also machined to form a rotation limiter notch. FIG. 15 also shows a schematic view of the rotation limiter notch of the rear bracket, according to one aspect of the present disclosure. As shown in the figure, when the rear bracket 7 is rotated to a predetermined mounting position, the bottom side of the notch contacts with the lower side of the securing block, providing limiting as shown in the right of FIG. 19. The rear bracket 7 is symmetrically machined. A side of the lower portion of the rear bracket 7 adjacent to the rear windshield 8 is designed to be a corner slot surface above the bottom portion.

FIG. 18 shows a cross-sectional view of the rear windshield 8 according to one aspect of the present disclosure. The rear windshield 8 mainly servers to shield wind from the rear, so as to prevent the backside of the module 1 from wind load. Besides, the rear windshield 8 serves as a top side supporting bar for the module, with the top portion thereof designed to be an arc surface to mate with the hook member 9 through a shaft structure, such that the rear bracket assembly can rotate smoothly. The side surface of the rear windshield 8 is provided with a groove in which a screw hole is provided. A connecting bolt may go through this screw hole to connected it with a screw hole in the side groove at the side surface of the rear bracket 7. Further, the groove may accommodate the connecting bolt such that it does not protrude beyond the side plane of the rear windshield 8. The lower portion of the rear windshield 8 is designed to be a clamp structure, which may be clamped with the corner slot surface of the lower portion of the rear bracket 7, so as to better connect with the rear bracket 7. The rear windshield 8 is machined to have reverse openings, to provide excellent ventilation for the whole system.

According to one aspect of the present disclosure, in the whole photovoltaic system, the rear bracket 7 locates higher than the front bracket 5, so as to have the rear bracket 7 disposed at a right angle with respect to the module 1, such that the stress on the rear bracket is reduced.

Figure 20:
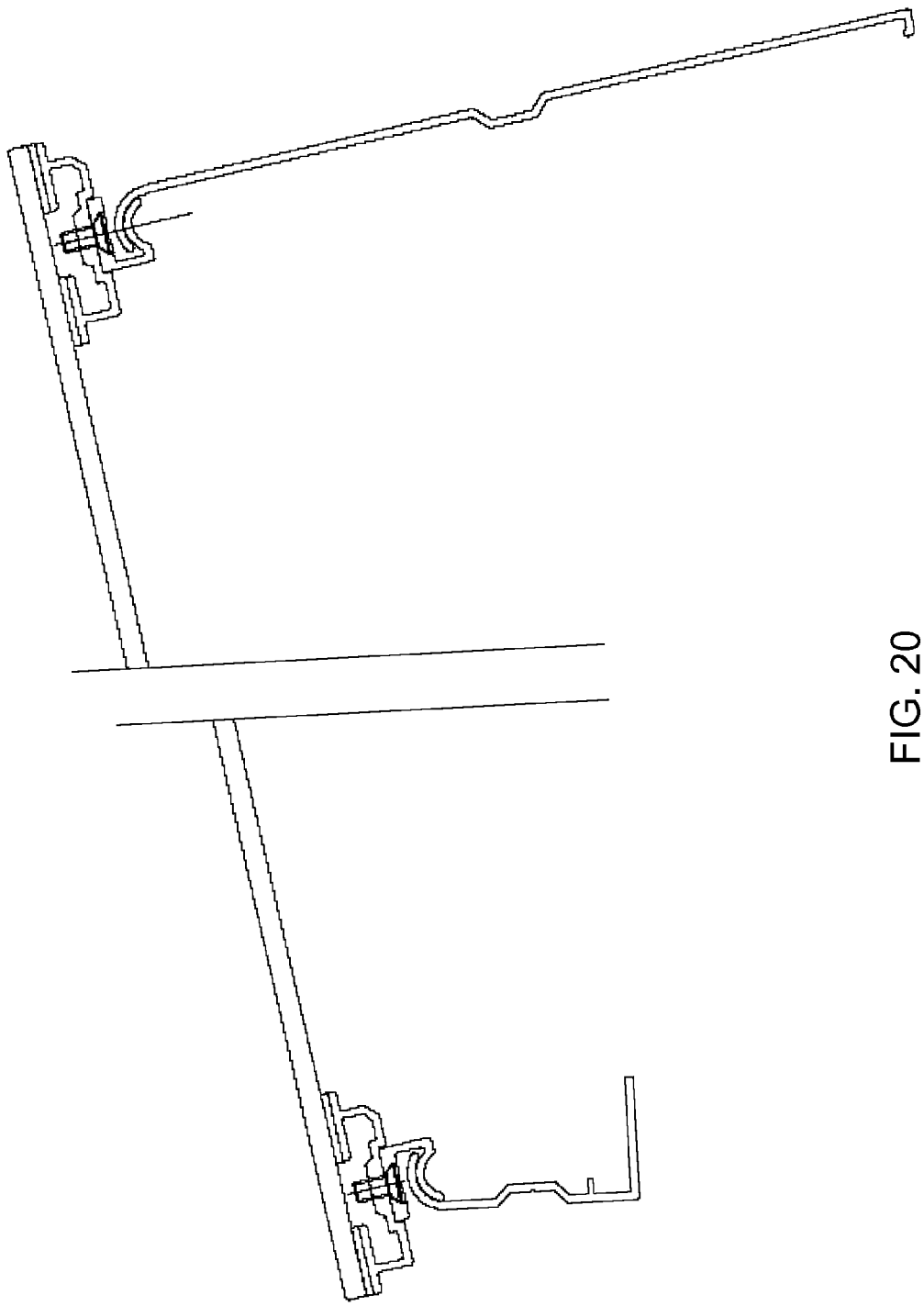
FIG. 20 shows a schematic view of the connection status of the hook member and the rear windshield along with the front cross-coupling beam when the front bracket and rear bracket are unfolded on site, according to a further embodiment of the present disclosure.

When the module system is shipped to the site, the countersunk bolt of the securing block 4 is released such that the front bracket assembly and the rear bracket assembly may be rotated smoothly. When the front and rear bracket assembly are rotated to a mounting position (as shown in FIG. 19), the countersunk bolt is secured again for mounting. FIG. 20 shows the connection status of the hook member, the rear windshield along with the front cross-coupling beam when the front bracket and rear bracket are unfolded. It will be noted that FIGS. 19, 20 do not show a complete module 1 but only the connection sections of the module 1 with the front and rear brackets, with the middle portions of the module 1 omitted.

Figure 21:
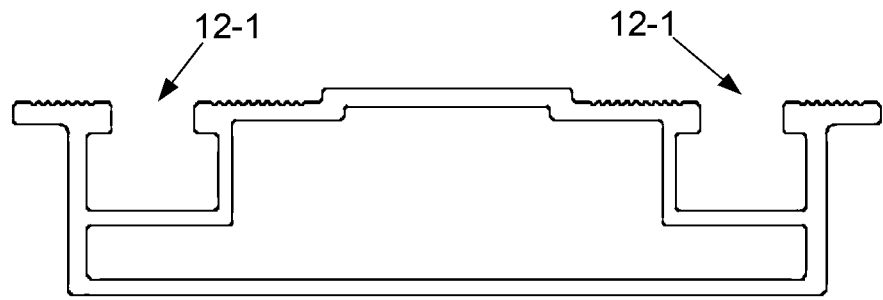
FIG. 21 shows a sectional view of the bottom connector member (keel frame), according to a further embodiment of the present disclosure.

FIG. 21 shows a cross-sectional view of the bottom connector member (keel frame) according to one aspect of the present disclosure. As shown, the left and right sides of the top portion of the bottom connector member (keel frame) 12 are respectively provided with a bolt head groove 12-1 for inserting a cover slab. A set of reverse ripples are provided at the portion of the top surface jointed with the front/rear bracket assembly. An extrusion portion is provided at the middle of the top surface of the bottom connector member (keel) 12 to provide a certain gap between the modules. According to a preferred embodiment, the width of the middle extrusion portion may be 28 mm. In addition, the cavity at the middle of the bottom connector member (keel frame) is relatively large. Since the connection length of the keel frame at the middle is relatively short, the front and rear cabling of module 1 may routed through this.

Figure 22:
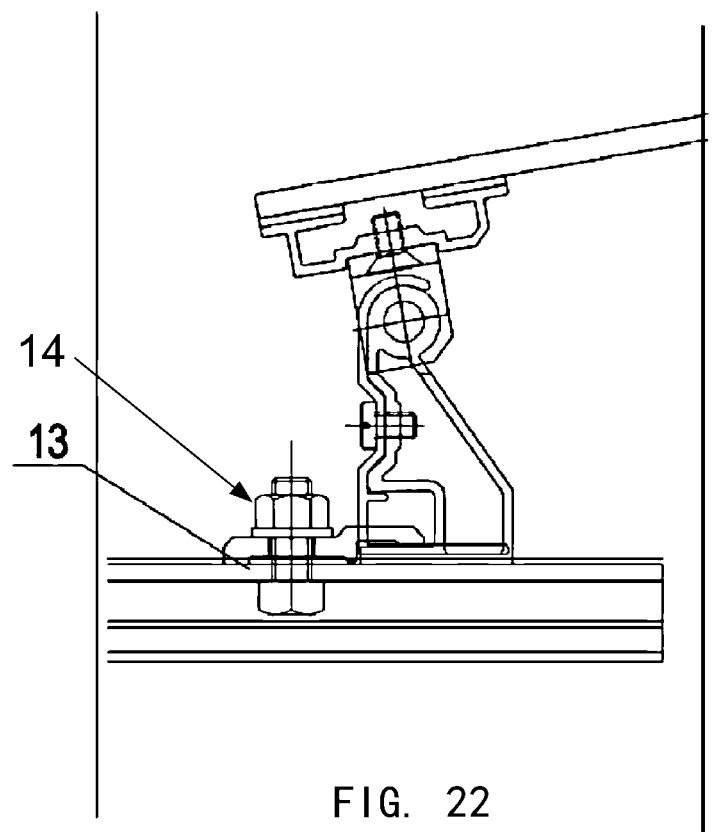
FIG. 22 shows a diagram of a cover slab securing structure, according to a further embodiment of the present disclosure.
Figure 23:
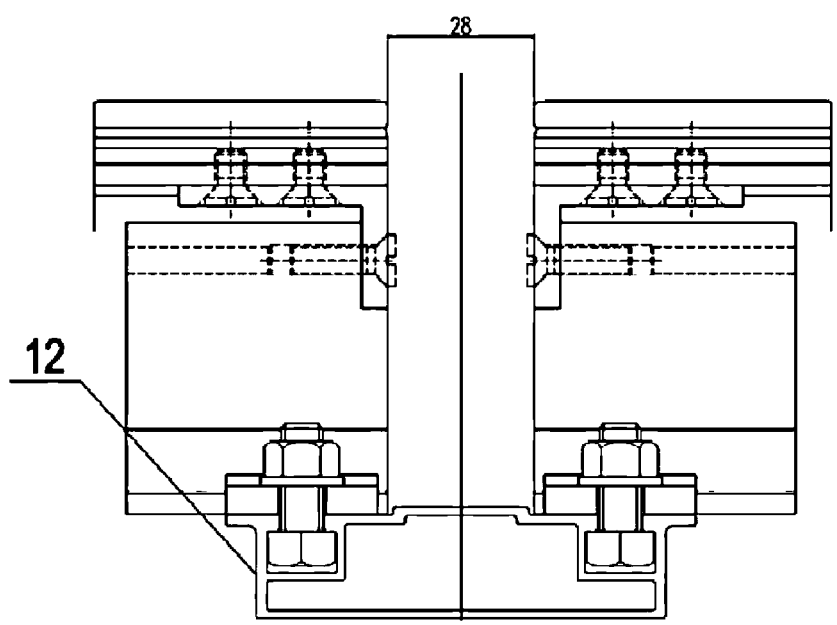
FIG. 23 shows a diagram of the module connected with the bottom connector member, according to a further embodiment of the present disclosure.
Figure 25:
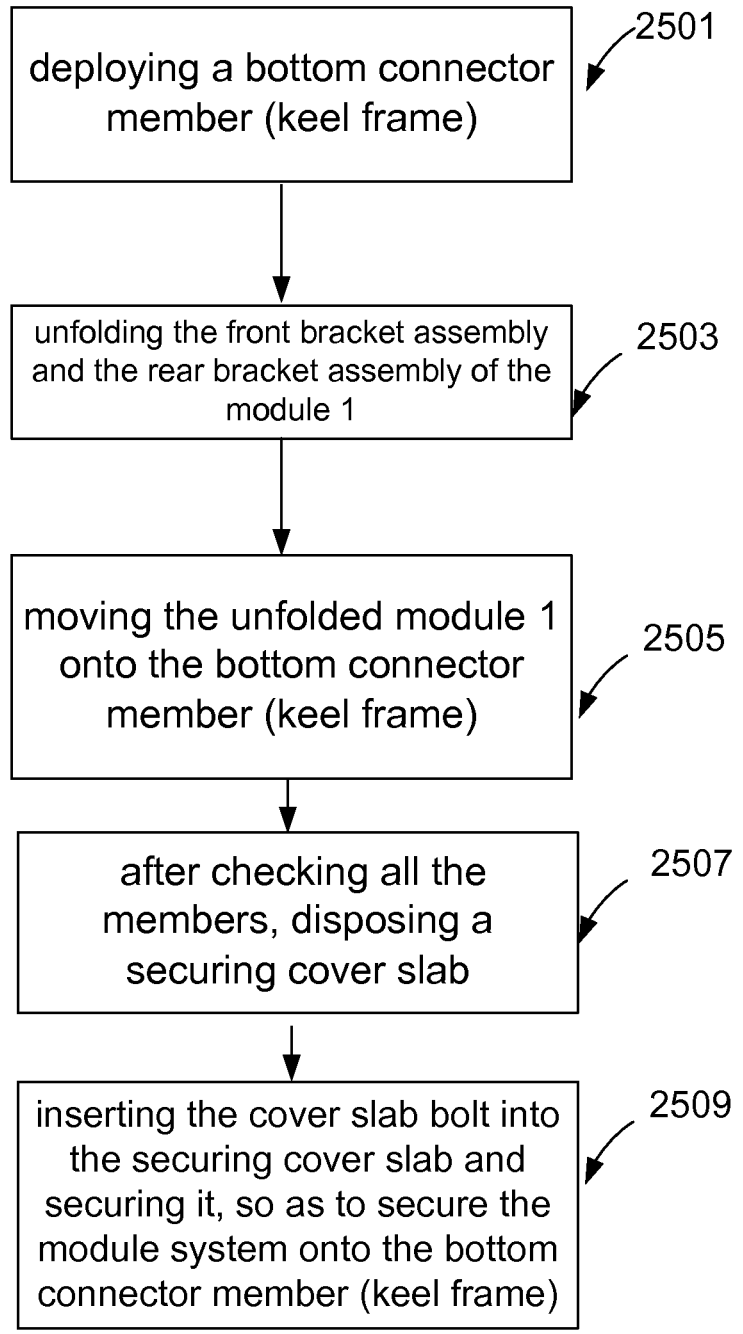
FIG. 25 shows a flowchart of on site mounting work for the system, according to a further embodiment of the present disclosure.

FIG. 25 shows a flow chart of on site mounting work for the system, according to one aspect of the present disclosure. When mounting on site, at step 2501, the bottom connector member (keel frame) 12 is deployed at first. Then continuing to step 2503, the front bracket assembly and the rear bracket assembly of module 1 are unfolded (i.e. the securing bolt is released), and the front/rear bracket assemblies are rotated to a mounting position and secured again, as shown in FIGS. 19-20. Then in step 2505, the module 1 that has been configured to the mounting position is moved onto the bottom connector member (keel frame) 12. In step 2507, all members are deposited and checked, then a securing cover slab 13 is inserted to secure the front bracket assembly and the rear bracket assembly. As shown in FIG. 22, a portion of the securing cover slab 13 is clamped into the mounting slot provided at the lower portions of the front bracket assembly and the rear bracket assembly. Thereafter, at step 2509, the cover slab bolt 14 is inserted into the securing cover slab 13, and a portion of the cover slab bolt 14 is accommodated and secured in the cover slab bolt head slot 12-1 of the bottom connector member (keel frame) 12, thereby securing the module system on the bottom connector member (keel frame) 12. This mounting work is simple and particularly feasible for mounting on site. FIGS. 22, 23 show the detailed mounting structure. According to a preferred embodiment, several wood liner strips may be prepared prior to mounting, and the cover slab bolt 14 may be pre-disposed in the cover slab bolt head slot 12-1 of the bottom connector member (keel) 12, thereby for fast and easy mounting. Besides, all cables are deployed prior to securing the cover slab bolt and the securing cover slab. After connection, the rest of cables may be positioned in the inner side of the bottom connector member (keel frame) 12.

Figure 24:
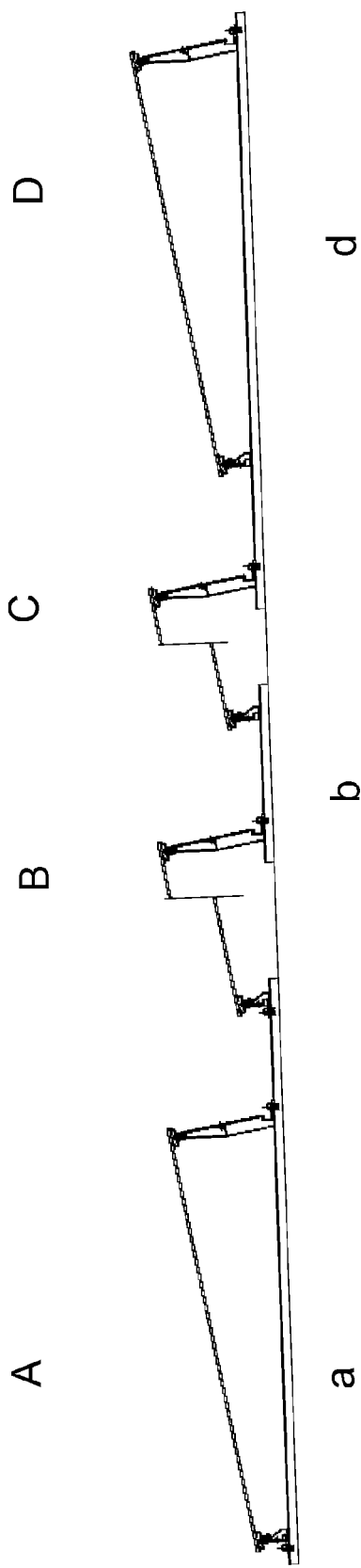
FIG. 24 shows a schematic view of a longitudinal cross-section of the photovoltaic matrix system, according to a further embodiment of the present disclosure.

FIG. 24 shows a schematic view of a longitudinal cross-section of the photovoltaic matrix system, according to one aspect of the present disclosure. It will be noted that FIG. 24 does not show a complete module 1, but only the connection portions of the module 1, the front and rear brackets and the bottom connector member (keel frame), with the middle portions of the module 1 omitted from the figure. As shown in FIG. 24, a plurality of modules 1 are arranged into rows. FIG. 24 only shows a module system A in the beginning position and a module system D in the last position, together with a module system B in the second position and a module system C in the second to last position. It will be appreciated that there may be multiple intermediate module systems between the module system B and the module system C, as desired by the practical needs. As shown, the bottom connector members (keel frame) a in the beginning position and the bottom connector members (keel frame) d in the last position are connected, respectively, to the front and rear assemblies of the module system A in the beginning position and the module system D in the last position. The front bracket assembly of the module system B in the second position is connected to the bottom connector member (keel frame) a in the very beginning position, and the rear bracket assembly thereof is connected to the bottom connector member (keel frame) b in the second position. Similarly, the front bracket assembly of the module systems C in the second to last position is connected to the bottom connector member (keel frame) c (not shown) in the second to last position, and the rear bracket assembly thereof is connected to the bottom connector member (keel frame) d in the last position. It will be appreciated that, when there is only four module systems A, B, C, D, only three bottom connector members (keel frame) a, b, d are required, with the front bracket assembly of the module system C in the second to last position directly connected to the bottom connector member b in the second position. When there is a number n (n being more than four) of module systems, the intermediate keel frames (i.e. the keel frame in the second position to the keel frame in the n−1 position) are connected to the rear bracket assembly of the previous neighboring module system and the front bracket assembly of the subsequent neighboring module system. Accordingly, the whole solar photovoltaic square array system is formed.

The solar photovoltaic module and mounting structure thereof according to the above embodiments of the present disclosure provide the following advantages:

1. An integrated structure including panels and support structures is constructed, in which the support members can be rotated to achieve accommodation and mounting angle adjustment.

2. The roof module may be made to be frameless modules, wherein the backside of the module is bonded with a backside securing block connector member. A securing block is mounted on the backside securing block connector member, and is for connecting with the front and rear brackets. A securing block positioning slot is provided on the backside securing block connector member. This efficiently reduces the manufacturing cost.

3. The front and rear brackets of the roof module are secured via a securing block and may be rotated to facilitate shipping. When mounting on site, it only needs to unfold the front and rear brackets and rotate them to an appropriate position. The front bracket is comprised of a front bracket and a front cross-coupling beam, while the rear bracket is comprised of a rear bracket and a rear windshield.

4. In the roof module, the hook member is connected with the backside hook connector block bonded at the backside of the module. the hook member serves to connect the module with the front and rear brackets when there is a negative wind load from the front side. When there is a positive load, it serves to transfer and reduce the load.

5. The front and rear brackets are formed with aluminum section bar by extrusion molding, which is easy in machining and light-weighted. The assembling of the module is accomplished in factory. When mounting on site, it only needs to deploy the bottom connector member (keel frame) on the roof and secure the module with cover slab, which is feasible for deployment.

6. The cross-coupling beam of the front bracket and the windshield of the rear bracket are designed to provide support for the structure. The mechanical strength for the module is improved by dispersed the load through the hook and introducing more support structures for the module.

7. By separating two modules in the same array separate from each other by 30 mm, or by punching a plurality of reversed opening on the windshield, the ventilation of the module is guaranteed.

8. The module is pre-assembled in the factory, which reduces the labor for mounting on site, thereby saving mounting time, improving efficiency and reducing mounting cost.

9. When accommodating support structures, it only needs to fold and rotate the support members to be parallel with the panel, such that the volume of the whole folding module is minimized, the number of parts for the mounting structure is reduced, the transportation of the module is convenient, and the shipping cost is reduced.

10. The module is light-weighted, such that the load onto the roof is reduced. The parts does not require any particular manufacturing process, such that fabrication cost is reduced.

It would be apparent to a skilled person in the art that various modifications and variations may be made to the above exemplary embodiments without departing from the spirit and scope of the disclosure. Thus, it is intended that the modifications and variations to the present disclosure within the spirit and scope of the disclosure are covered by the attached claims and equivalents thereof.

What is clamed is:

1. A photovoltaic module mounting structure, comprising:
   a plurality of photovoltaic modules, each of which being attached with:
   a first backside securing block connector member and a first backside hook connector member attached to a first side of the photovoltaic module, the first backside securing block connector member and the first backside hook connector member further attached to a front bracket assembly;
   a second backside securing block connector member and a second backside hook connector member attached to a second side of the photovoltaic module, the second backside securing block connector member and the second backside hook connector member further attached to a rear bracket assembly;

wherein the front bracket assembly is freely rotatable about the first backside securing block connector member and the first backside hook connector member, and the rear bracket assembly is freely rotatable about the second backside securing block connector member and the second backside hook connector member;

wherein the plurality of photovoltaic modules are arranged into rows, and are connected to each other by one of a plurality of bottom connector members, so as to constitute a photovoltaic module matrix system;

wherein the plurality of photovoltaic modules comprise two photovoltaic modules positioned on two ends of each of the rows respectively; wherein the two photovoltaic modules define a first position and a last position of each of the rows respectively; wherein two photovoltaic modules placed adjacent to each other in each of the rows define a neighboring position with respect to each other;

wherein the front bracket assembly and the rear bracket assembly of the photovoltaic module in the first position are attached to the plurality of bottom connector members in the first position;

wherein the front bracket assembly and the rear bracket assembly of the photovoltaic module in the last position are attached to the plurality of bottom connector members in the last position;

wherein the front bracket assembly of each of the photovoltaic modules between the photovoltaic module in the first position and the photovoltaic module in the last position is attached to the plurality of bottom connector members in the neighboring position defined by the photovoltaic module and a photovoltaic module placed to one side of the photovoltaic module, and the rear bracket assembly of each of the photovoltaic modules between the photovoltaic module in the first position and the photovoltaic module in the last position is attached to the plurality of bottom connector members in the neighboring position defined by the photovoltaic module and another photovoltaic module placed to the other side of the photovoltaic module;

wherein the first backside securing block connector member, the first backside hook connector member, the second backside securing block connector member and the second backside hook connector member are attached to the photovoltaic module by using an adhesive structural tape, the adhesive structural tape being disposed on a predetermined attaching portion of the top wing surfaces of the first and second backside hook connector members as well as the first and second backside securing block connector members; and wherein the first and second backside securing block connector members have a similar structure as that of the first and second backside hook connector members, both of which being formed from a section bar by extrusion molding, and wherein the first and second backside securing block connector members are attached to the first bracket assembly and the rear bracket assembly, respectively, via a securing block, the first and second backside hook connector members are attached to the front bracket assembly and the rear bracket assembly via a hook member, and wherein bottom sides of the first and second backside securing block connector members and the first and second backside hook connector members in contact with the securing block or the hook member are curved with a shallow groove to provide position limiting for the securing block or the hook member during mounting, the bottom sides being further provided with a screw hole corresponding to a countersunk bore of the securing block or the hook member.

2. The photovoltaic module mounting structure according to claim 1, wherein the securing block has a L-shaped and a thickness to ensure a connection strength, a bottom side of the securing block is provided with a sink hole for connection with the first and second backside securing block connector members, and wherein the sink hole being provided for a countersunk bolt to pass through, and the securing block has a chamfered side at a side opposing to the sink hole.

3. The photovoltaic module mounting structure according to claim 2, wherein the hook member is comprised of a bottom side and an arc hook portion, a sink hole is disposed on the bottom side of the hook member for connection with the first and second backside hook connector members, the sink hole being provided for a countersunk bolt to pass through, the arc hook portion has a concave rounded surface for mating with a top R-shaped member of the front bracket assembly and a top R-shaped member of the rear bracket assembly, such that when the photovoltaic module is subject to a positive wind pressure and is pressed down, the concave rounded surface is mated with the top R-shaped members, thereby transferring the load from the module to underlying members stepwise, and when the photovoltaic module is subject to a negative wind and is blew away from the mounting structure, the arc hook portion is be hooked with the top R-shaped members of the front bracket assembly and rear bracket assembly, thereby contending against the negative wind pressure with the whole mounting structure, and wherein the arc hook portion further serving as a rotation pin for limiting the rotation of the front and rear brackets.

4. The photovoltaic module mounting structure according to claim 3, wherein the front bracket assembly is comprised of a front bracket and a front cross-coupling beam, and is formed with a R-shaped member on the top thereof, the front bracket assembly is connected to the securing block via a countersunk bolt and is mated with the hook member with the R-shaped member, the bottom portion of the front bracket assembly is secured to the plurality of bottom connector members by a cover slab structure and is disposed at a right angle with respect to the plurality of bottom connector members, wherein the side portion of the front bracket assembly is formed to be a slope structure to avoid any potential collision with the backside securing block connector member, the side surface of the front bracket further fits the cross-coupling beam, and a side portion of the front bracket and a side portion of the cross-coupling beam which are connected with each other both have a groove, the grooves couple with each other and both have a screw hole, the front bracket is assembled with the cross-coupling beam via the screw hole with a connecting bolt head, the bottom portion of the front bracket assembly is provided with a mounting slot to mate with a cover slab, and the top portion of the front bracket is machined with a rotation limiter notch, such that when the front bracket assembly is rotated to a mounting position, the bottom side of the notch contacts with bottom side of the securing block to provide position limiting.

5. The photovoltaic module mounting structure according to claim 4, wherein the top of the front cross-coupling beam is designed with an arc surface so as to mate with the hook member via a shaft structure to facilitate smooth rotation of the front bracket assembly, and the bolt head is received by a groove on the side surface of the cross-coupling beam such that it does not protrude beyond the side plane of the cross-coupling beam, a side of the lower portion of the front bracket adjacent to the cross-coupling beam is designed to be a corner slot surface above the bottom portion such that one side of the lower portion of the cross-coupling beam clamps with the corner slot surface, thereby better connecting with the front bracket, and one end on the other side of the lower portion of the cross-coupling beam further fits the lower portion of the front bracket and is machined with a notch and is punched with a screw hole.

6. The photovoltaic module mounting structure according to claim 5, wherein the rear bracket assembly is comprised of a rear bracket and a rear windshield, and is formed with a R-shaped member on the top, the top portion of the rear bracket assembly is connected to the securing block via a countersunk bolt, and the lower portion thereof is secured to the plurality of bottom connector members by a cover slab structure, wherein the rear bracket is also a rotating member, and it is formed with a cylindrical head and is shaped into a R-shaped, and is provided with a rounded hole for facilitating thread machining, the side portion of the rear bracket assembly is formed to be a slope structure to avoid any potential collision with the backside securing block connector member, the side surface of the rear bracket further fits the rear windshield, and a side portion of the rear bracket and a side portion of the rear windshield which are connected with each other both have a groove, the grooves couple with each other and both have a screw hole, the rear bracket is assembled with the rear windshield via the screw hole with a connecting bolt head, the lower portion of the rear bracket assembly is provided with a mounting slot, and the top portion of the rear bracket is machined with a rotation limiter notch, such that when the rear bracket assembly is rotated to a mounting position, the bottom side of the notch contacts with bottom side of the securing block to provide position limiting.

7. The photovoltaic module mounting structure according to claim 6, wherein one of the functions of the rear windshield is to shield wind from the rear to prevent the backside of the photovoltaic from wind load, while the top of the rear windshield is designed to be an arc surface to mate with the hook member through a shaft structure such that the rear bracket assembly can rotate smoothly, further, the groove at the side surface of the rear windshield can receive the connecting bolt head such that it does not protrude beyond the side plane of the windshield, further, a side of the lower portion of the rear bracket adjacent to the rear windshield is designed to be a corner slot surface above the bottom portion, and the lower portion of the rear windshield is formed with a clamp structure to clamp with the corner slot surface of the rear bracket such that it better connects with the rear bracket, the rear windshield is machined to have reverse opening to provide excellent ventilation for the whole photovoltaic module mounting structure.

8. The photovoltaic module mounting structure according to claim 7, wherein the countersunk bolt of the securing block can be released such that the front bracket assembly and the rear bracket assembly can be rotated smoothly, and when the front bracket assembly and the rear bracket assembly are rotated to a mounting position, the countersunk bolt is secured again for mounting.

9. The photovoltaic module mounting structure according to claim 7, wherein the left and right sides of the top portion of the plurality of bottom connector members are respectively disposed with a bolt head groove for a cover slab, and a set of reverse ripple are provided at the portion of the top surface jointed with the front bracket assembly and the rear bracket assembly, further, an extrusion portion is provided at the middle of the top surface of the plurality of bottom connector members, so as to provide a certain gap between the modules.

10. The photovoltaic module mounting structure according to claim 9, wherein the width of the extrusion portion at the middle of the top surface of the plurality of bottom connector members is 28 mm.

11. A photovoltaic module mounting structure, comprising:
a plurality of photovoltaic modules, each of which being attached with;
a first backside securing block connector member and a first backside hook connector member attached to a first side of the photovoltaic module, the first backside securing block connector member and the first backside hook connector member further attached to a front bracket assembly;
a second backside securing block connector member and a second backside hook connector member attached to a second side of the photovoltaic module, the second backside securing block connector member and the second backside hook connector member further attached to a rear bracket assembly;
wherein the front bracket assembly is freely rotatable about the first backside securing block connector member and the first backside hook connector member, and the rear bracket assembly is freely rotatable about the second backside securing block connector member and the second backside hook connector member;
wherein the first and second backside securing block connector members have a similar structure as that of the first and second backside hook connector members, both of which being formed from a section bar by extrusion molding, and wherein the first and second backside securing block connector members are attached to the first bracket assembly and the rear bracket assembly, respectively, via a securing block, the first and second backside hook connector members are attached to the front bracket assembly and the rear bracket assembly via a hook member, and wherein bottom sides of the first and second backside securing block connector members and the first and second backside hook connector members in contact with the securing block or the hook member are curved with a shallow groove to provide position limiting for the securing block or the hook member during mounting, the bottom sides being further provided with a screw hole corresponding to a countersunk bore of the securing block or the hook member.

* * * * *